(12) United States Patent
Tang

(10) Patent No.: US 11,064,456 B2
(45) Date of Patent: Jul. 13, 2021

(54) WIRELESS COMMUNICATION METHOD, DEVICE, CHIP AND SYSTEM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/721,735

(22) Filed: Dec. 19, 2019

(65) Prior Publication Data

US 2020/0145960 A1    May 7, 2020

Related U.S. Application Data

(63) Continuation of application No. PCT/CN2018/086051, filed on May 8, 2018.

(51) Int. Cl.
*H04W 68/00* (2009.01)
*H04W 52/02* (2009.01)
(Continued)

(52) U.S. Cl.
CPC ..... *H04W 68/005* (2013.01); *H04W 52/0229* (2013.01); *H04W 68/02* (2013.01); *H04W 72/042* (2013.01)

(58) Field of Classification Search
CPC ........... H04W 68/005; H04W 52/0229; H04W 68/02; H04W 72/042
See application file for complete search history.

(56) References Cited

U.S. PATENT DOCUMENTS

2016/0309282 A1* 10/2016 Xu ................. H04W 72/042
2018/0098304 A1*  4/2018 Reial ............... H04W 68/02
(Continued)

FOREIGN PATENT DOCUMENTS

CN        101115288 A      1/2008
CN         1725870 B       8/2010
(Continued)

OTHER PUBLICATIONS

International Search Report in the international application No. PCT/CN2018/086051, dated Jan. 23, 2019.
(Continued)

*Primary Examiner* — Ernest G Tacsik
(74) *Attorney, Agent, or Firm* — Ladas & Parry, LLP

(57) ABSTRACT

Provided are a wireless communication method, a device, a chip and a system. The method is applied to a terminal device in a connected state; the method includes: the terminal device receives first indication information sent by a network device, the first indication information being used to indicate whether change indication information of a system broadcast exists in a paging message; and the terminal device determines whether to receive the paging message sent by the network device according to the first indication information. The first indication information is sent by the network device, in the case where the change indication information of the system broadcast is not included in the current paging message, preventing the terminal device from acquiring and decoding the paging message to verify if there is the change indication information of the system broadcast, thereby reducing the complexity and the power consumption of the UE.

7 Claims, 3 Drawing Sheets

(51) Int. Cl.
  *H04W 68/02* (2009.01)
  *H04W 72/04* (2009.01)

(56) References Cited

U.S. PATENT DOCUMENTS

| | | | | |
|---|---|---|---|---|
| 2018/0317198 | A1* | 11/2018 | Lee | H04L 5/0007 |
| 2018/0352416 | A1 | 12/2018 | Ryu et al. | |
| 2019/0124625 | A1* | 4/2019 | Takeda | H04W 48/16 |
| 2020/0328848 | A1* | 10/2020 | He | H04L 1/1854 |

FOREIGN PATENT DOCUMENTS

| | | |
|---|---|---|
| CN | 101873694 A | 10/2010 |
| CN | 101998580 A | 3/2011 |
| CN | 102026372 A | 4/2011 |
| CN | 103139880 A | 6/2013 |
| CN | 107734598 A | 2/2018 |
| CN | 107925952 A | 4/2018 |
| CN | 107925983 A | 4/2018 |
| EP | 3281423 A1 | 2/2018 |
| EP | 3389329 A1 | 10/2018 |
| WO | 2016168973 A1 | 10/2016 |
| WO | 2017003235 A1 | 1/2017 |
| WO | 2017113391 A1 | 7/2017 |
| WO | 2017119838 A1 | 7/2017 |
| WO | 2017176438 A1 | 10/2017 |
| WO | 2019213844 A1 | 11/2019 |

OTHER PUBLICATIONS

Written Opinion of the International Search Authority in the international application No. PCT/CN2018/086051, dated Jan. 23, 2019 and English translation provided by Google Translate.
The Chinese First Examination Report and Search Reporet of corresponding Chinese application No. 201880003281.2, dated Feb. 6, 2020.
The Chinese Second Examination Report of corresponding Chinese application No. 201880003281.2, dated Mar. 31, 2020.
LG Electronics, 3GPP TSG RAN WG1 Meeting #92bis Sanya, China, Apr. 16-20, 2018.
The EESR of corresponding European application 18917610.0, Date Jul. 10, 2020.
The third Office Action of corresponding Chinese application 201880003281.2, dated Jun. 9, 2020.
The Notice of Allowance of corresponding Chinese application 201880003281.2, dated Aug. 19, 2020.
3rd Generation Partnership Project;Technical Specification Group Radio Access Network;Evolved Universal Terrestrial Radio Access (E-UTRA);Radio Resource Control (RRC);Protocol specification(Release 14), published on Sep. 9, 2016.

* cited by examiner

WIRELESS COMMUNICATION METHOD, DEVICE, CHIP AND SYSTEM

CROSS-REFERENCE TO RELATED DISCLOSURES

This application is a continuation of International Application No. PCT/CN2018/086051, filed on May 8, 2018 and titled "WIRELESS COMMUNICATION METHOD, DEVICE, CHIP AND SYSTEM", the whole content of which is incorporate herein by reference.

TECHNICAL FIELD

Embodiments of the present disclosure relate to the field of communication technologies and, in particular, to a wireless communication method, a device, a chip and a system.

BACKGROUND

With the pursuit of speed, latency, high-speed mobility, energy efficiency by human beings, as well as the diversity and complexity of services in the future life, the 3rd Generation Partnership Project (3GPP) international standards organization began to develop the fifth generation of mobile communication technology (5G).

In the early deployment of the 5G New Radio (NR), a user equipment (UE) in the 5G NR is similar to the UE in the long term evolution (LTE), the UE performs an attach registration in a core network firstly, then there is context information of the UE in the core network, one of which is location area information (TA list). When there is a paging of the UE, the core network sends a paging message to all base stations where the TA list is located, and triggers the base stations to send the paging for the UE in all cells under the base stations. Therefore, a paging range of a UE at least refers to that all cells in the range of one TA list send the paging message.

For a receiving process of the paging message, the LTE and the NR are similar. The UE needs to listen to a paging radio network temporary identifier (P-RNTI) in a common search space, then acquires scheduling information of the paging message, and then decodes a physical downlink shared channel (PDSCH) corresponding to the paging message to acquire the content of the paging message. The paging message may include change indication information of a system broadcast, and may also include identifier list information of the paged UE, or both.

Currently, in order to reduce the load of the UE decoding the paging message, a paging physical downlink control channel (PDCCH) is divided into a long message and a short message.

The long message includes a paging PDCCH and a paging PDSCH, and if there is the change indication information of the system broadcast, then the change indication information must be included in the paging message (paging PDSCH), a terminal device must decode the paging PDSCH first when it needs to know whether the paging PDSCH itself includes the change indication information of the system broadcast.

Therefore, when the above technical solution is adopted, for a UE in a connected state, a main purpose of the UE listening to the paging message is to acquire the change indication information of the system broadcast, and then obtain updated system broadcast information. However, the changing of the system broadcast in a cell is an infrequent process. Therefore, in the case where the UE in the connected state adopts the long message, it always needs to decode the paging PDSCH to obtain the change indication information of the system broadcast. Even if the current paging message does not include the change indication information of the system broadcast, the UE in the connected state still needs to decode the paging PDSCH to obtain this information to verify whether there is the change indication information of the system broadcast, thus wasting power of the UE and increasing a complexity.

Therefore, how to reduce the complexity and a power consumption of the UE during a paging process by the UE is an urgent problem to be solved.

SUMMARY

Provided are a wireless communication method, a device, a chip and a system, which are capable of reducing a complexity and a power consumption of a UE during a paging process.

In a first aspect, a wireless communication method is provided, which is applied to a terminal device in a connected state;

the method includes:

receiving, by the terminal device, first indication information sent by a network device, where the first indication information is used to indicate whether there is change indication information of a system broadcast in a paging message; and determining, by the terminal device according to the first indication information, whether to receive the paging message sent by the network device.

In the embodiment of the present disclosure, the first indication information is sent by the network device, in this way, in the case where the change indication information of the system broadcast is not included in the current paging message, preventing the terminal device in the connected state from acquiring and decoding the paging message to verify if there is the change indication information of the system broadcast, thereby reducing the complexity and the power consumption of the UE.

In some possible implementations, the determining, by the terminal device according to the first indication information, whether to receive the paging message sent by the network device includes:

determining, by the terminal device, not to receive the paging message when the first indication information is used to indicate that the change indication information does not exist in the paging message.

In some possible implementations, the determining, by the terminal device according to the first indication information, whether to receive the paging message sent by the network device includes:

determining, by the terminal device, to receive the paging message when the first indication information is used to indicate that the change indication information exists in the paging message;

the method further includes:

receiving and decoding, by the terminal device, the paging message to obtain the change indication information.

In some possible implementations, when the first indication information is a first value, the first indication information is used to indicate that the change indication information does not exist in the paging message; when the first indication information is a second value, the indication information is used to indicate that the change indication information exists in the paging message.

In some possible implementations, the receiving, by the terminal device, first indication information sent by a network device includes:

receiving, by the terminal device, a physical downlink control channel (PDCCH) sent by the network device, where the PDCCH includes the first indication information and scheduling information, and the scheduling information is used to indicate a resource position of the paging message in a physical downlink shared channel (PDSCH).

In a second aspect, a wireless communication method is provided, including:

generating, by a network device, first indication information, where the first indication information is used to indicate whether change indication information of a system broadcast exists in a paging message; and sending, by the network device, the first indication information to a terminal device in a connected state.

In some possible implementations, when the first indication information is a first value, the first indication information is used to indicate that the change indication information does not exist in the paging message; when the first indication information is a second value, the first indication information is used to indicate that the change indication information exists in the paging message.

In some possible implementations, the sending, by the network device, the first indication information to a terminal device in a connected state includes:

sending, by the network device, a physical downlink control channel (PDCCH) to the terminal device, where the PDCCH includes the first indication information and scheduling information, and the scheduling information is used to indicate that a resource location of the paging message in a physical downlink shared channel (PDSCH).

In some possible implementations, the method further includes:

sending, by the network device, the paging message to the terminal device.

In a third aspect, a communication device is provided for executing the method according to either the first aspect or the second aspect, or the method according to any of the possible implementations described above.

In some possible implementations, the communications device includes:

a functional module for executing the method according to either the first aspect or the second aspect, or the method according to any of the possible implementations described above.

In some possible implementations, the communication device is a terminal device, and the terminal device is configured to execute the method according to the first aspect or any of the possible implementations of the first aspect.

In some possible implementations, the communication device is a network device, and the network device is configured to execute the method according to the second aspect or any of the possible implementation of the second aspect.

In a fourth aspect, a communication device is provided, including:

a processor, configured to call and run a computer program from a memory, the computer program is configured to execute the method according to either the first aspect or the second aspect, or the method according to any of the possible implementations described above.

In some possible implementations, the communication device further includes:

a memory, the memory is configured to store the computer program.

In some possible implementations, the communication device is a terminal device, and the terminal device is configured to execute the method according to the first aspect or any of the possible implementation of the first aspect.

In some possible implementations, the communication device is a network device, and the network device is configured to execute the method according to the second aspect or any of the possible implementation of the second aspect.

In a fifth aspect, a chip is provided for executing the method according to either the first aspect or the second aspect, or the method according to any of the possible implementations described above.

In some possible implementations, the chip includes:

a processor, configured to call and run a computer program from a memory, the computer program is configured to execute the method according to either the first aspect or the second aspect, or the method according to any of the possible implementations described above.

In some possible implementations, the chip further includes:

a memory, the memory is configured to store the computer program.

In a sixth aspect, a computer readable storage medium is provided, the storage medium is configured to store a computer program, the computer program is configured to execute the method according to either the first aspect or the second aspect, or the method according to any of the possible implementations described above.

In a seventh aspect, a computer program product is provided, which includes computer program instructions, the computer program product is configured to execute the method according to either the first aspect or the second aspect, or the method according to any of the possible implementations described above.

In an eighth aspect, a computer program is provided, which when running on a computer, causes a computer to execute the method according to either the first aspect or the second aspect, or the method according to any of the possible implementations.

In a ninth aspect, a communication system is provided, including a terminal device in a connected state and a network device;

the network device is configured to:

generate first indication information, the first indication information being used to indicate whether change indication information of a system broadcast exists in a paging message, and send the first indication information to the terminal device;

the terminal device is configured to:

receive the first indication information sent by the network device, and determine whether to receive the paging message sent by the network device according to the first indication information.

In some possible implementations, the terminal device is configured to execute the method according to the first aspect or the possible implementations described above, and the network device is configured to execute the method according to the second aspect or the possible implementations described above.

DESCRIPTION OF EMBODIMENTS

The technical solutions in the embodiments of the present disclosure will be clearly and completely described in the following with reference to the accompanying drawings in the embodiments of the present disclosure.

Figure 1:
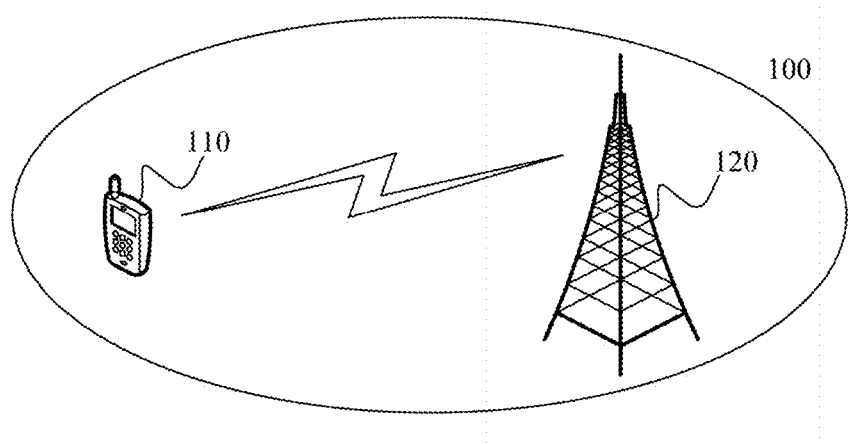
FIG. 1 is an example of an application scenario of the present disclosure.

FIG. 1 is a schematic diagram of an application scenario of an embodiment of the present disclosure.

As shown in FIG. 1, a communication system 100 may include a terminal device 110 and a network device 120. The network device 120 can communicate with the terminal device 110 over an air interface. A multi-service transmission is supported between the terminal device 110 and the network device 120.

It should be understood that the embodiments of the present disclosure are simply illustrated by taking the communication system 100 as an example, but the embodiments of the present disclosure are not limited thereto. That is, the technical solution of the embodiment of the present disclosure can be applied to various communication systems, for example, a global system of mobile communication (GSM) system, a code division multiple access (CDMA) system, a wideband code division multiple access (WCDMA) system, a general packet radio service (GPRS), a long term evolution (LTE) system, a LTE time division duplex (TDD), a universal mobile telecommunication system (UMTS), a worldwide interoperability for microwave access (WiMAX) communication system, a new radio (NR) or future 5G systems.

Taking the 5G system as an example, the technical solution of the embodiment of the present disclosure can be applied to a wide-area long term evolution (LTE) coverage and an island coverage mode of NR. Moreover, a large number of LTEs are deployed below 6 GHz, and there are few spectrums below 6 GHz that can be used for 5G. Therefore, the NR must study spectrum disclosures above 6 GHz, however, the coverage is limited in high band and signal fading is fast. At the same time, in order to protect an early investment in LTE by mobile operators, a tight interworking working mode between the LTE and the NR is proposed.

The main application scenarios of 5G include: an enhanced mobile broadband (eMBB), an ultra-reliable and low latency communication (URLLC) and a massive machine type of communication (mMTC). Among them, the eMBB targets at the obtaining of multimedia contents, services and data by users, the demand for which is thus growing rapidly. Since the eMBB may be deployed in different scenarios, for example, indoors, urban areas, rural areas and so on, differences in their abilities and needs are relatively large, so it can be analyzed in detail in combination with specific deployment scenarios instead of generalization. Typical disclosures for the URLLC include: industrial automation, power automation, telemedicine operations (surgery), traffic safety and so on. Typical features of mMTC include: a high connection density, a small data volume, delay-insensitive service, a low cost and long lifetime.

In addition, since it is difficult to obtain a complete 5G NR coverage, the network coverage in the embodiment of the present disclosure may adopt a wide-area long term evolution (LTE) coverage and an island coverage mode of NR. At the same time, in order to protect an early investment in LTE by the mobile operators, the tight interworking mode can be further adopted between the LTE and the NR.

In the communication system 100 shown in FIG. 1, the network device 120 may be an access network device that communicates with the terminal device 110. The access network device can provide a communication coverage for a particular geographic area and can communicate with the terminal devices 110 (e.g., a UE) located within the coverage area.

For example, the access network device may be a base transceiver station (BTS) in a global system of mobile communication (GSM) system or a code division multiple access (CDMA), or may be a NodeB (NB) in a wideband code division multiple access (WCDMA) system, may also be an evolutional Node B (eNB or eNodeB) in a long term evolution (LTE) system.

In an implementation, the access network device may also be a next generation radio access network (NG RAN), or a base station (gNB) in a NR system, or a wireless controller in a cloud radio access network (CRAN), or the access network device may be a relay station, an access point, an in-vehicle device, a wearable device, or a network device in a future evolved public land mobile network (PLMN) and so forth.

The terminal device 110 can be any terminal device, and the terminal device 110 can communicate with one or more core networks via a radio access network (RAN), and can also be referred to as an access terminal, a user equipment (UE), a subscriber unit, a subscriber station, a mobile station, a remote station, a remote terminal, a mobile device, a user terminal, a terminal, a wireless communication device, a user agent or a user equipment. For example, it can be a cellular phone, a cordless phone, a session initiation protocol (SIP) phone, a wireless local loop (WLL) station, a personal digital assistant (PDA), and a wireless communication function, a handheld devices with a wireless communication capability, a computing device or a further processing devices connected to a wireless modem, an in-vehicle device, a wearable device, a terminal device in a 5G network and the like.

It should be understood that the terms "system" and "network" are used interchangeably herein.

Figure 2:
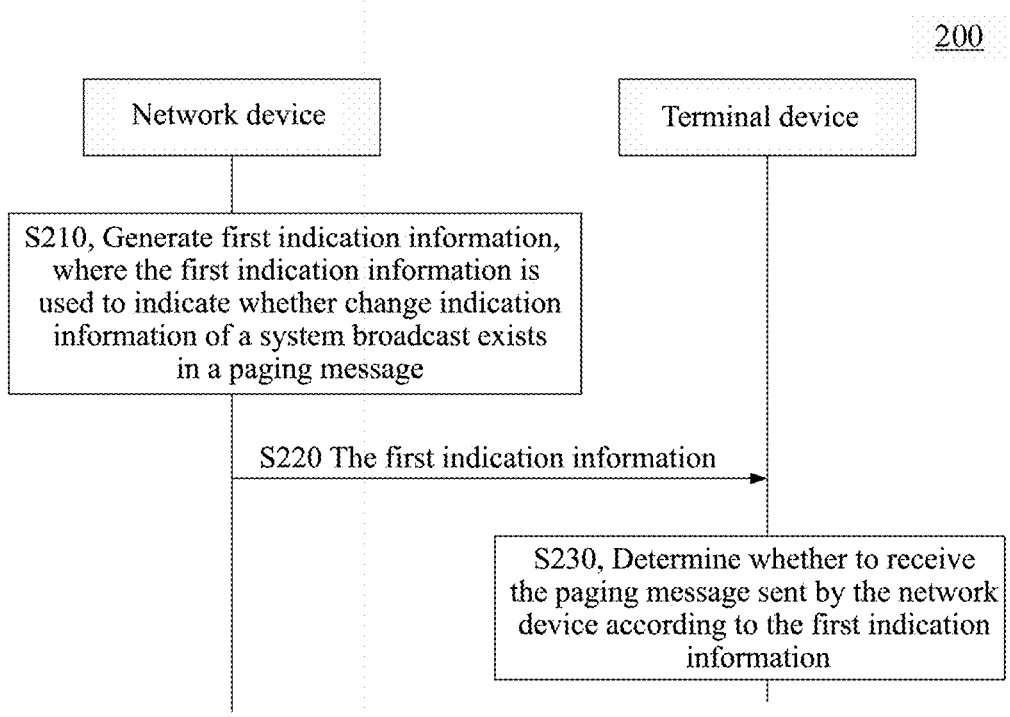
FIG. 2 is a schematic block diagram of a wireless communication method according to an embodiment of the present disclosure.

FIG. 2 shows a schematic flow diagram of a wireless communication method 200 according to an embodiment of the present disclosure, the method can be executed by the terminal device and the network device. The terminal device shown in FIG. 2 may be the terminal device in a connected state as shown in FIG. 1, and the network device shown in FIG. 2 may be the access network device as shown in FIG. 1. The method 200 includes some or all of the following:

as shown in FIG. 2, the method 200 includes:

S210: the network device generates first indication information, where the first indication information is used to indicate whether change indication information of a system broadcast exists in a paging message.

S220: the network device sends the first indication information to the terminal device.

S230: the terminal device determines whether to receive the paging message sent by the network device according to the first indication information.

Specifically, from the perspective of the terminal device, the terminal device receives the first indication information sent by the network device, and the terminal device determines whether to receive the paging message sent by the network device according to the first indication information. In other words, from the perspective of the network device, the network device generates the first indication information, and sends the first indication information to the terminal device in the connected state.

In the embodiment of the present disclosure, the first indication information is sent by the network device, in this way, in the case where the change indication information of the system broadcast is not included in the current paging message, preventing the terminal device in the connected state from acquiring and decoding the paging message to verify if there is the change indication information of the system broadcast, thereby reducing the complexity and the power consumption of the UE.

It should be understood that, in the embodiment of the present disclosure, the specific transmission form of the paging message is not limited.

For example, a multi-beam form may be adopted, in particular, in order to page to the UE, the paging message may be sent under each beam of each cell. For example, for a cell deployed with a high frequency, such as 64, the paging in one cell needs to be sent 64 times.

In an embodiment, when the first indication information is used to indicate that the change indication information does not exist in the paging message, the terminal device determines not to receive the paging message.

In another embodiment, when the first indication information is used to indicate that the change indication information exists in the paging message, the terminal device determines to receive the paging message; in this way, the terminal device can receive and decode the paging message to acquire the change indication information.

In an implementation, when the first indication information is a first value, the first indication information is used to indicate that the change indication information does not exist in the paging message; when the first indication information is a second value, the first indication information is used to indicate that the change indication information exists in the paging message.

For example, if the change indication information of the system broadcast does not exist in the paging message, then the indication bit is set to 0, otherwise it is set to 1.

For another example, if the change indication information of the system broadcast exists in the paging message, the indication bit is set to 1, otherwise it is set to 0.

It should be understood that the first indication information is only an example, and the embodiment of the present disclosure is not limited thereto. For example, the first indication information may also be display indication or implicit indication manners in other forms.

In an implementation, the terminal device receives a physical downlink control channel (PDCCH) sent by the network device, where the PDCCH includes the first indication information and scheduling information, and the scheduling information is used to indicate a resources position of the paging message in a physical downlink shared channel (PDSCH). Specifically, the UE in the connected state blindly detects the PDCCH scrambled by the P-RNTI, if the first indication information indicates that the change indication information of the system broadcast does not exist in the subsequent paging message, the UE in the connected state does not collect the corresponding paging message, otherwise, collect the paging message. In other words, from the perspective of the network device, the network device sends the physical downlink control channel (PDCCH) to the terminal device, the PDCCH includes the first indication information and the scheduling information, and the scheduling information is used to indicate the resource position of the paging message in the physical downlink shared channel (PDSCH).

In an actual process, if the network device sends the scheduling information of the paging message, the scheduling information is followed by the paging message. Then, an indication bit is added to the paging PDCCH to indicate whether the change indication information of the system broadcast exists in the subsequent paging message. It should be understood that the paging PDCCH can be understood as the PDCCH corresponding to the paging message.

Therefore, in the embodiment of the present disclosure, the UE needs to listen to the P-RNTI in an common search space, then obtains the scheduling information of the paging message and the first indication information, and then determines whether to receive and decode the PDSCH corresponding to the paging message according to the first indication information, to obtain the content of the paging message. When the PDSCH corresponding to the paging message is determined and decoded to obtain the content of the paging message, the paging message is received and decoded according to the scheduling information to obtain the change indication information of the system broadcast.

It should be understood that, in the embodiment of the present disclosure, the first indication information and the scheduling information may be respectively carried in the PDCCH, the first indication information may also be carried in the scheduling information, and the scheduling information is carried in the PDCCH, which is not limited in the embodiment of the present disclosure.

The preferred embodiment of the present disclosure is described in detail above with reference to the accompanying drawing, however, the present disclosure is not limited to the specific details in the embodiment, and various simple modifications may be made to the technical solution of the present disclosure within the scope of the technical concept of the present disclosure, and these simple variations are within the scope of this disclosure.

For example, the specific technical features described in the specific embodiments may be combined in any suitable manner without contradiction. In order to avoid unnecessary repetition, various possible combination manners will not be described in the present disclosure.

For another example, any combination among the various embodiments of the present disclosure can be made as long as it does not contradict the idea of the present disclosure, and it should also be regarded as the content disclosed in the present disclosure.

It should be understood that, in the various method embodiments of the present disclosure, the sizes of the sequence numbers of each processes do not mean the order of execution, and the order of execution of each process should be determined by its function and an internal logic, which should not make any limitation to the implement process of the embodiment of the present disclosure.

The method embodiment of the present disclosure has been described in detail above with reference to FIG. 2, and the apparatus embodiment of the present disclosure will be described in detail below with reference to FIG. 3 to FIG. 6.

Figure 3:
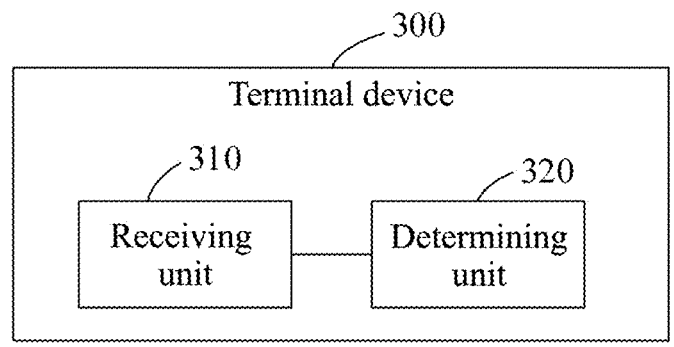
FIG. 3 is a schematic block diagram of a terminal device according to an embodiment of the present disclosure.

FIG. 3 is a schematic block diagram of the terminal device 300 according to an embodiment of the present disclosure.

Specifically, as shown in FIG. 3, the terminal device 300 may include:

a receiving unit 310, configured to receive first indication information sent by a network device, where the first indication information is used to indicate whether change indication information of a system broadcast exists in a paging message; and a determining unit 320, configured to determine, according to the first indication information, whether to receive the paging message sent by the network device.

In an implementation, the determining unit 320 is specifically configured to:

determine not to receive the paging message when the first indication information is used to indicate that the change indication information does not exist in the paging message.

In an implementation, the determining unit 320 is specifically configured to:

determine to receive the paging message when the first indication information is used to indicate that the change indication information exists in the paging message; the receiving unit 310 is further configured to:

receive and decode the paging message to obtain the change indication information.

In an implementation, when the first indication information is the first value, the first indication information is used to indicate that the change indication information does not exist in the paging message; when the first indication information is the second value, the first indication information is used to indicate that the change indication information exists in the paging message.

In an implementation, the receiving unit 310 is specifically configured to:

receive the physical downlink control channel (PDCCH) sent by the network device, where the PDCCH includes the first indication information and scheduling information, and the scheduling information is used to indicate a resource position of the paging message in a physical downlink shared channel (PDSCH).

Figure 4:
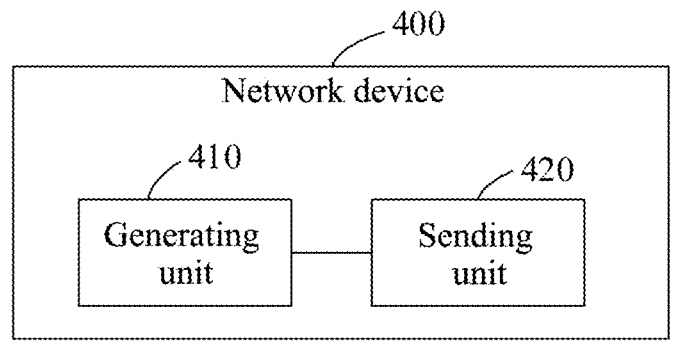
FIG. 4 is a schematic block diagram of a network device according to an embodiment of the present disclosure.

FIG. 4 is a schematic block diagram of the network device 400 according to an embodiment of the present disclosure.

Specifically, as shown in FIG. 4, the network device may include:

a generating unit 410, configured to generate the first indication information, where the first indication information is used to indicate whether change indication information of a system broadcast exists in a paging message; and a sending unit 420, configured to send the first indication information to a terminal device in a connected state.

In an implementation, when the first indication information is the first value, the first indication information is used to indicate that the change indication information does not exist in the paging message; when the first indication information is the second value, the first indication information is used to indicate that the change indication information exists in the paging message.

In an implementation, the sending 420 unit is specifically configured to:

send a physical downlink control channel (PDCCH) to the terminal device, where the PDCCH includes the first indication information and scheduling information, and the scheduling information is used to indicate a resource location of the paging message in a physical downlink shared channel (PDSCH).

In an implementation, the sending 420 unit is further configured to:

send the paging message to the terminal device.

It should be understood that the apparatus embodiment and the method embodiment may correspond to each other, and similar descriptions may refer to the method embodiment. Specifically, the terminal device 300 and the network device 400 shown in FIG. 3 may correspond to corresponding main subject body that executes the method 200 of the embodiment of the present disclosure, and the foregoing and other operations and/or functions of the respective units in the terminal device 300 and the network device 400 are respectively for implementing the corresponding processes in the methods of FIG. 2, and are not elaborated herein for brevity.

The communication device of the embodiment of the present disclosure has been described above from the perspective of a functional module in combination with FIG. 3 and FIG. 4. It should be understood that the functional module may be implemented by hardware, by software instructions, or by a combination of hardware and software modules.

Specifically, the steps in the method embodiment of the present disclosure may be implemented by an integrated logic circuit of the hardware and/or instructions in a software manner in the processor. The steps of the method disclosed in combination with the embodiment of the present disclosure may be directly embodied as being completed and executed by a hardware decoding processor, or as being completed and executed by a combination of hardware and software modules in the decoding processor.

Alternatively, the software modules may be located in mature storage mediums such as conventional storage mediums, random access memories, flash memories, read only memories, programmable read only memories, electrically erasable programmable memories, registers and the like. The storage medium is located in the memory, the processor reads the information in the memory, and completes the steps in the method embodiment in combination with the hardware.

For example, in the embodiment of the present disclosure, the determining unit 320 shown in FIG. 3 and the generating unit 410 shown in FIG. 4 may be implemented by the processor, and the receiving unit 310 shown in FIG. 3 and the transmitting unit 420 shown in FIG. 4 may be implemented by a transceiver.

Figure 5:
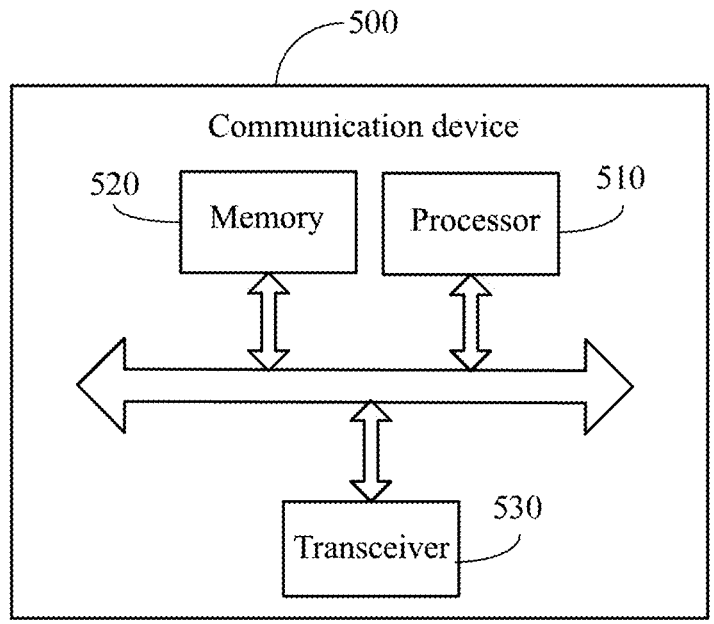
FIG. 5 is a schematic block diagram of a communication device according to an embodiment of the present disclosure.

FIG. 5 is a schematic structural diagram of a communication device 500 according to an embodiment of the present disclosure. The communication device 500 shown in FIG. 5 includes a processor 510 that can call and run a computer program from a memory to implement the methods in the embodiments of the present disclosure.

In an implementation, as shown in FIG. 5, the communication device 500 may further include a memory 520. The memory 520 can be used to store indication information and can also be used to store codes, instructions and the like executed by the processor 510. The processor 510 can call and run the computer program from the memory 520 to implement the method in the embodiment of the present disclosure.

The memory 520 may be a separate device independent of the processor 510 or may be integrated in the processor 510.

In an implementation, as shown in FIG. 5, the communication device 500 may further include the transceiver 530, and the processor 510 may control the transceiver 530 to communicate with other devices, in particular, may send information or data to other devices, or receive information or data sent by other devices.

Among them, the transceiver 530 can include a transmitter and a receiver. The transceiver 530 may further include an antenna, and the amount of the antennas may be one or more.

In an implementation, the communication device 500 can be the network device of the embodiment of the present disclosure, and the communication device 500 can implement corresponding processes implemented by the network device in the methods of the embodiment of the present disclosure. That is, the communication device 500 of the embodiment of the present disclosure may correspond to the network device 400 in the embodiment of the present disclosure, and may correspond to the corresponding subject body executing the method 200 according to the embodiment of the present disclosure, which will not be elaborated herein for brevity.

In an implementation, the communication device 500 can be the terminal device of the embodiment of the present disclosure, and the communication device 500 can implement the corresponding process implemented by the terminal device in the methods of the embodiment of the present disclosure, that is, the communication device 500 of the embodiment of the present disclosure may correspond to the terminal device 300 in the embodiment of the present disclosure, and may correspond to the corresponding subject body executing the method 200 according to the embodiment of the present disclosure, which will not be elaborated herein for brevity.

It should be understood that the various components in the communication device 500 are connected through a bus system, where the bus system includes a power bus, a control bus, and a status signal bus in addition to a data bus.

In addition, the embodiment of the present disclosure further provides the chip that may be an integrated circuit chip, which has a signal processing capability, and can implement or execute the various methods, steps and logic block diagrams disclosed in the embodiments of the present disclosure.

Alternatively, the chip can be applied to various communication devices such that the communication device mounted with the chip is capable of executing the various methods, steps, and logic blocks disclosed in the embodiments of the present disclosure.

Figure 6:
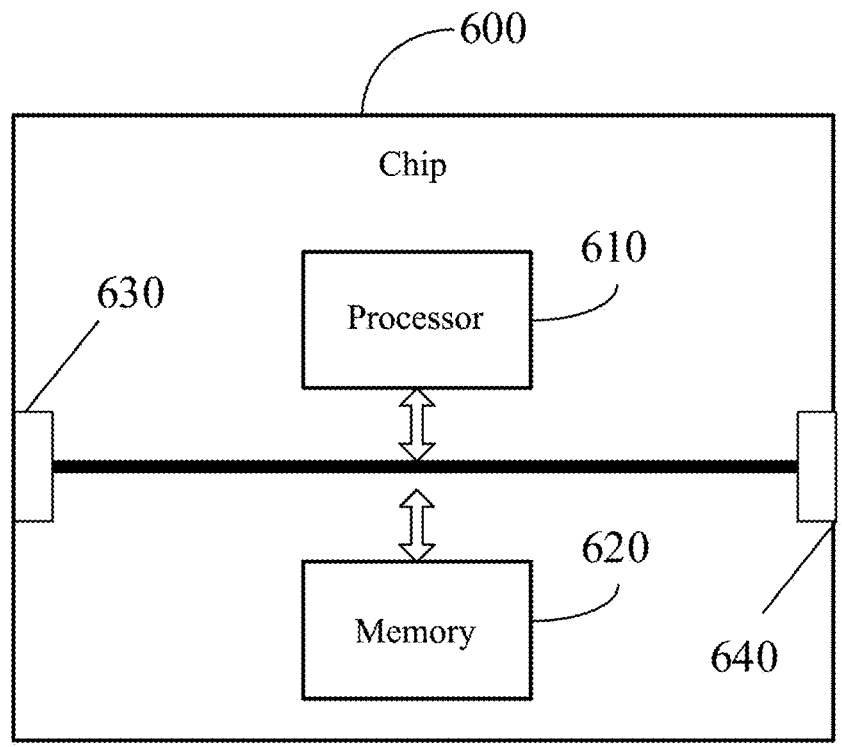
FIG. 6 is a schematic block diagram of a chip according to an embodiment of the present disclosure.

FIG. 6 is a schematic structural diagram of the chip according to an embodiment of the present disclosure.

The chip 600 shown in FIG. 6 includes a processor 610 that can call and run a computer program from a memory to implement the methods in the embodiments of the present disclosure.

In an implementation, as shown in FIG. 6, the chip 600 may further include a memory 620. Where, the processor 610 can call and run a computer program from the memory 620 to implement the method in the embodiment of the present disclosure. The memory 620 can be used to store indication information and can also be used to store codes, instructions and the like executed by the processor 610.

The memory 620 may be a separate device independent of the processor 610 or may be integrated in the processor 610.

In an implementation, the chip 600 may further include an input interface 630. Where the processor 610 can control the input interface 630 to communicate with other devices or chips, in particular, to acquire information or data sent by other devices or chips.

In an implementation, the chip 600 may further include an output interface 640. Where the processor 610 can control the output interface 640 to communicate with other devices or chips, in particular, to output information or data to other devices or chips.

In an implementation, the chip can be applied to the network device in the embodiment of the present disclosure, and the chip can implement the corresponding process implemented by the network device in the methods of the embodiment of the present disclosure, which will not be elaborated herein for brevity.

In an implementation, the chip can be applied to the terminal device in the embodiment of the present disclosure, and the chip can implement the corresponding process implemented by the terminal device in the methods of the embodiment of the present disclosure, which will not be elaborated herein for brevity.

It should be understood that the chip mentioned in the embodiment of the present disclosure may also be referred to as a system level chip, a system chip, a chip system or a system on chip. It should also be understood that the various components of the chip 600 are connected through the bus system, where the bus system includes a power bus, a control bus, and a status signal bus in addition to a data bus.

The processor mentioned in the embodiment of the present disclosure may be a general purpose processor, a digital signal processor (DSP), an disclosure specific integrated circuit (ASIC), a field programmable gate array (FPGA) or other programmable logic devices, transistor logic devices, discrete hardware components and so on. Further, the general purpose processor may be a microprocessor or the processor may be any conventional processor or the like.

Furthermore, the memory referred to in the embodiments of the present disclosure may be a volatile memory or a non-volatile memory, or may include both volatile and non-volatile memories. The non-volatile memory may be a read-only memory (ROM), a programmable read only memory (ROMM), an erasable programmable read only memory (EPROM), an electrical Erase programmable EPROM (EEPROM) or flash memory. The volatile memory may be a random access memory (RAM) that acts as an external cache.

It should be understood that the above memory is illustrative but not limiting. For example, the memory in the embodiment of the present disclosure may also be a static RAM (SRAM), a dynamic RAM (DRAM), a dynamic RAM (DRAM), a Synchronous dynamic RAM (SDRAM), a double data rate synchronous dynamic RAM (DDR SDRAM), an enhanced synchronous dynamic RAM (ES-DRAM), a synchronous connection Synchro link DRAM (SLDRAM), a direct memory bus (DR RAM) and so on. That is, the memories of the systems and methods described herein are intended to include, but not to be limited to these and any other suitable types of memories.

Figure 7:
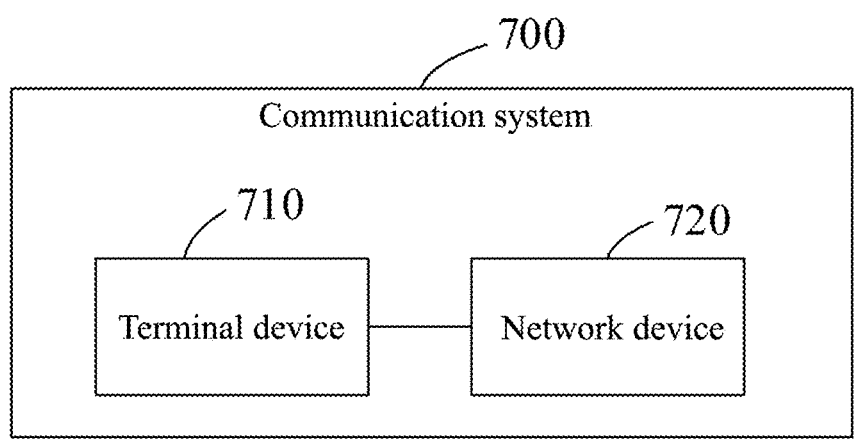
FIG. 7 is a schematic block diagram of a communication system according to an embodiment of the present disclosure.

FIG. 7 is a schematic block diagram of a communication system 700 according to an embodiment of the present disclosure. As shown in FIG. 7, the communication system 700 includes a terminal device 710 and a network device 720.

Where the network device 720 is configured to:

generate the first indication information which is used to indicate whether change indication information of a system broadcast exists in a paging message, and send the first indication information to the terminal device.

The terminal device 710 is configured to:

receive the first indication information sent by the network device, and determine whether to receive the paging message sent by the network device according to the first indication information.

Where the terminal device 710 can be used to implement the corresponding functions implemented by the terminal device in the foregoing method 200, and the terminal device 710 can compose the terminal device 300 shown in FIG. 3. It will not elaborate herein for brevity.

The network device 720 can be used to implement the corresponding functions implemented by the network device in the foregoing methods, and the network device 720 can compose the network device 400 shown in FIG. 4. It will not elaborate herein for brevity.

It should be noted that the term "system" and the like herein may also be referred to as "network management architecture" or "network system" and the like.

It should also be understood that the terminologies used in the embodiments of the present disclosure and the appended claims are simply for the purpose of describing specific embodiments, rather than limiting the embodiments of the present disclosure.

For example, the singular forms "one", "described", "above" and "this" used in the embodiments of the present disclosure and the appended claims, unless otherwise clearly, are also intended to include plural forms.

Those skilled in the art will appreciate that the elements and algorithm steps of the various examples described in combination with the embodiments disclosed herein can be implemented in electronic hardware or a combination of computer software and electronic hardware. Whether these functions are performed in hardware or software depends on the specific disclosure and design constraints of the solution. Those skilled in the art can use different methods to implement the described functions for each particular disclosure, but such implementation should not be considered to be beyond the scope of the embodiments of the disclosure.

If it is implemented in the form of a software functional unit and sold or used as a standalone product, it can be stored in a computer readable storage medium. Based on such understanding, the essence of the technical solution of the embodiments of the present disclosure, or the part contributing to the prior art or the part of the technical solution, may be embodied in the form of a software product which is stored in a storage medium, the storage medium includes a plurality of instructions, so that a computer device (which may be a personal computer, a server, or a network device, etc.) executes all or part of the steps of the methods in the embodiments of the present disclosure. The foregoing storage medium includes various media that can store program codes, such as a USB flash drive, a mobile hard disk, a read only memory, a random access memory, a magnetic disk, an optical disk and so on.

Those skilled in the art can clearly understand that for the convenience and brevity of the description, the specific working process of the system, the device and the unit described above can refer to the corresponding process in the foregoing method embodiment, which are not elaborated herein again.

In the several embodiments provided herein, it should be understood that the disclosed systems, apparatus, and methods may be implemented in other ways.

For example, the division of a unit or a module or a component in the device embodiment described above is only a logical function division, and other division manners may be adopted in actual implementations. For example, multiple units or modules or components may be combined or integrated into another system, or some units, modules or components can be ignored, or not executed.

For another example, the units/modules/components described above as separate/display components may or may not be physically separate, that is, they may be located in one place, or may be distributed over multiple network elements. Some or all of the units/modules/components may be selected according to actual needs to achieve the objectives of the embodiments of the present disclosure.

Finally, it should be noted that the mutual coupling or direct coupling or communication connection shown or discussed above may be an indirect coupling or communication connection through some interfaces, devices or units, which may be in an electrical form, a mechanical form or in other forms.

The above is only specific implementations of the embodiments of the present disclosure, but the scope of protection of the embodiments of the present disclosure is not limited thereto, and any person skilled in the art can easily think of variations or substitutions within the technical scope disclosed in the embodiments of the present disclosure, which are intended to be included within the scope of the embodiments of the disclosure. Therefore, the scope of protection of the embodiments of the present disclosure should be determined by the scope of protection of the claims.

What is claimed is:

1. A wireless communication method which is applied to a terminal device in a connected state and comprises:
   receiving, by the terminal device, a physical downlink control channel (PDCCH) sent by the network device, wherein the PDCCH comprises first indication information and scheduling information, the first indication information is used to indicate whether change indication information of a system broadcast exists in a paging message, the scheduling information is used to indicate a resource position of the paging message in a physical downlink shared channel (PDSCH), and the change indication information is used to indicate a change in the system broadcast; and
   determining, by the terminal device, not to decode the PDSCH corresponding to the paging message according to the scheduling information when the first indication information indicates that the change indication information does not exist in the paging message;
   the method further comprises:
   determining, by the terminal device, to receive the paging message when the first indication information indicates that the change indication information exists in the paging message; and
   receiving and decoding, by the terminal device, the paging message to obtain the change indication information.

2. The method according to claim 1, wherein when the first indication information is a first value, the first indication information is used to indicate that the change indication information does not exist in the paging message; when the first indication information is a second value, the indication information is used to indicate that the change indication information exists in the paging message.

3. A terminal device which is in a connected state and comprises a processor and a transceiver,
   the processor is configured to control the transceiver to receive a physical downlink control channel (PDCCH) sent by a network device, wherein the PDCCH comprises first indication information and scheduling information, the first indication information is used to indicate whether change indication information of a system broadcast exists in a paging message, the change indication information is used to indicate a change in the system broadcast and the scheduling information is used to indicate a resource position of the paging message in a physical downlink shared channel (PDSCH);

the processor is configured to determine not to decode the PDSCH according to the scheduling information when the first indication information indicates that the change indication information does not exist in the paging message; and the processor is further configured to:

determine to receive the paging message when the first indication information is used to indicate that the change indication information exists in the paging message; and receive the paging message to obtain the change indication information.

4. The terminal device according to claim 3, wherein when the first indication information is a first value, the first indication information is used to indicate that the change indication information does not exist in the paging message; when the first indication information is a second value, the first indication information is used to indicate that the change indication information exists in the paging message.

5. A network device, comprising: a processor and a transceiver, wherein, the processor is configured to:

generate first indication information, wherein the first indication information is used to indicate whether change indication information of a system broadcast exists in a paging message, and the change indication information is used to indicate a change in the system broadcast;

the processor is configured to control the transceiver to send a physical downlink control channel (PDCCH) to a terminal device in a connected state, wherein the PDCCH comprises the first indication information and scheduling information, and the scheduling information is used to indicate a resource location of the paging message in a physical downlink shared channel (PDSCH); and the processor is further configured to control the transceiver to:

send the PDSCH to the terminal device.

6. The network device according to claim 5, wherein when the first indication information is a first value, the first indication information is used to indicate that the change indication information does not exist in the paging message; when the first indication information is a second value, the first indication information is used to indicate that the change indication information exists in the paging message.

7. A storage medium, wherein the storage medium is configured to store a computer program, and the computer program comprises instructions used to execute the method according to claim 1.

* * * * *